United States Patent
Burch

(10) Patent No.: US 7,399,800 B2
(45) Date of Patent: Jul. 15, 2008

(54) TEMPERATURE SWITCHABLE ADHESIVES COMPRISING CRYSTALLIZABLE ABIETIC ACID DERIVATIVE-BASED TACKIFIERS

(75) Inventor: Robert Ray Burch, Exton, PA (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 446 days.

(21) Appl. No.: 11/108,007

(22) Filed: Apr. 15, 2005

(65) Prior Publication Data

US 2006/0235121 A1 Oct. 19, 2006

(51) Int. Cl.
*C08L 93/04* (2006.01)
(52) U.S. Cl. .................. 524/274; 524/270; 524/271; 524/272; 524/273
(58) Field of Classification Search .......... 524/270–274
See application file for complete search history.

(56) References Cited

U.S. PATENT DOCUMENTS

| | | | | |
|---|---|---|---|---|
| 1,957,786 A | * | 5/1934 | Koch | ............ 524/273 |
| 2,179,339 A | * | 11/1939 | Little | ............ 106/178.1 |
| 3,873,643 A | * | 3/1975 | Wu et al. | ............ 525/193 |
| 4,421,737 A | | 12/1983 | Ito et al. | |
| 4,605,696 A | * | 8/1986 | Benko et al. | ............ 524/432 |
| 5,156,911 A | | 10/1992 | Stewart | |
| 5,387,450 A | | 2/1995 | Stewart | |
| 5,412,035 A | | 5/1995 | Schmitt et al. | |
| 5,698,620 A | * | 12/1997 | Wideman et al. | ............ 524/270 |

FOREIGN PATENT DOCUMENTS

PL 144242 6/1988

* cited by examiner

*Primary Examiner*—Peter Szekely

(57) ABSTRACT

Temperature switchable pressure sensitive adhesives comprising an elastomer and a crystallizable abietic acid derivative as tackifier are described. These pressure sensitive adhesives exhibit a sharp reduction in peel strength when the temperature is raised above the switching temperature. The adhesive properties of these adhesives may be readily tuned by adjusting the ratio of the elastomer and the crystallizable tackifier, and by altering the crystallizabe group on the tackifier. The temperature switchable pressure sensitive adhesives have use in medical, consumer, and industrial applications.

17 Claims, No Drawings

TEMPERATURE SWITCHABLE ADHESIVES COMPRISING CRYSTALLIZABLE ABIETIC ACID DERIVATIVE-BASED TACKIFIERS

FIELD OF THE INVENTION

The invention relates to the field of pressure sensitive adhesives. More specifically, the invention relates to temperature switchable pressure sensitive adhesives comprising crystallizable abietic acid derivatives as tackifier.

BACKGROUND OF THE INVENTION

Pressure sensitive adhesives (PSA) are well known and are used in many industrial, consumer and medical applications. Pressure sensitive adhesives are formulations typically comprising an elastomeric polymer, a tackifier, and optionally an oil or other additives. These adhesives remain permanently tacky and adhere instantaneously to a wide variety of surfaces with the application of a small amount of pressure. Pressure sensitive adhesives are generally used in the form of a coating on a backing, such as in adhesive bandages, wound dressings, transdermal delivery devices, tapes, stencils, wall paper, envelopes, stamps, and floor tiles.

For many applications, it is desirable to be able to remove the adhesive from the surface without significant force, so that the surface, for example, newly healed skin, is not damaged. For this reason, switchable adhesives, which undergo a reduction in peel strength with a change in conditions, have been developed. Switchable adhesives that exhibit a reduction in peel strength upon contact with water or exposure to UV radiation are known. Additionally, temperature switchable adhesives, which undergo a reduction in peel strength with a temperature change have also been reported.

Stewart in U.S. Pat. Nos. 5,156,911 and 5,387,450 describes a temperature switchable adhesive composition comprising a side chain crystallizable polymer. The adhesive is nontacky, or slightly tacky at room temperature, but is aggressively tacky at skin temperature. Therefore, the adhesive may be removed from the skin by cooling.

Schmitt et al. in U.S. Pat. No. 5,412,035 describe pressure sensitive adhesive compositions, containing a crystalline polymeric additive, that lose adhesive strength upon heating. The crystalline polymeric additive is preferably a side chain crystallizable polymer having a weight average molecular weight of less than 25,000.

The aforementioned temperature switchable adhesives provide the desirable property of losing adhesive strength with a change in temperature. However, it is difficult to adjust the temperature switchable properties of those adhesive compositions because a different crystallizable side chain polymer and monomer must be synthesized to meet different switching temperature requirements.

The use of abietic acid in the form of natural rosin, and the glycerin ester and the pentaerythritol ester of hydrogenated rosin, as a tackifier in pressure sensitive adhesives is known (Ito et al, U.S. Pat. No. 4,421,737). Additionally, the hexadecyl ester of abietic acid and its use as a plasticizer for polyvinyl chloride is described by Szczepanik et al. (Polish Patent No. 144242). However, the use of abietic acid derivatives having crystallizable groups as tackifiers for temperature switchable adhesives has not been reported.

In view of the above, the need exists for new temperature switchable adhesives for which the temperature switching properties may be readily adjusted to meet the requirements for many different applications by readily changing the tackifier and elastomer used in the formulation, according to standard principles of adhesive formulation.

Applicants have addressed the stated need by discovering that certain abietic acid derivatives having crystallizable groups may be used as a tackifier to give new temperature switchable pressure sensitive adhesive compositions. The adhesive properties of these adhesives may be readily tuned to meet the requirements of various applications.

SUMMARY OF THE INVENTION

The invention provides temperature switchable pressure sensitive adhesives comprising a crystallizable abietic acid derivative-based tackifier. These pressure sensitive adhesives exhibit a sharp reduction in peel strength when the temperature is raised above the switching temperature. Accordingly, in one embodiment the invention provides a composition comprising:

a) at least one elastomer; and
b) at least one crystallizable abietic acid derivative-based tackifier having the formula:

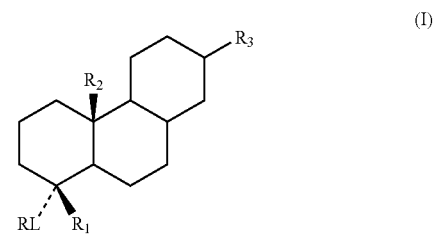

(I)

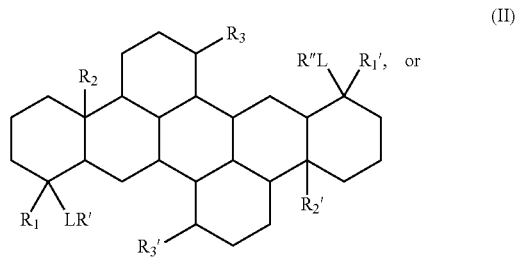

(II)

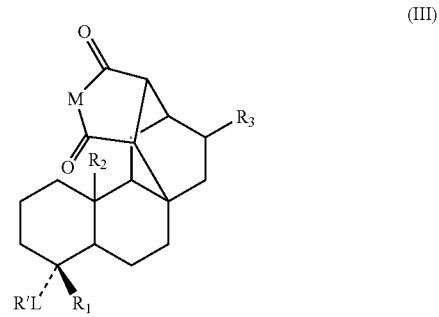

(III)

wherein:
(i) R is a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid;

(ii) $R_1$, $R_2$, $R_1'$, and $R_2'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms, provided that if the ring containing $R_1$ and $R_2$ is aromatic, then $R_1$ and $R_2$ are not present, and if the ring containing $R_1'$ and $R_2'$ is aromatic, then $R_1'$ and $R_2'$ are not present;

(iii) $R_3$ and $R_3'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms;

(iv) R' and R" are independently R, H, methyl, ethyl, glycerol, or glycol;

(v) M is O or NRL;

(vi) the six-membered rings have carbon-carbon single bonds or a combination of carbon-carbon single bonds and carbon-carbon double bonds;

(vii) the six membered rings of (I) and (III) are independently aromatic or non-aromatic, provided that no more than two of the rings are aromatic;

(viii) the six membered rings of (II) are independently aromatic or non-aromatic, provided that no more than four of the rings are aromatic;

(ix) L is an optional spacer selected from the group consisting of:

—(CO)—, —O—(CO)—, —OCH$_2$—, vinyl, amide,

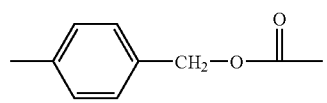

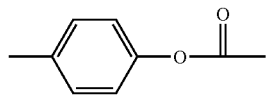

—(CO)O(CHR$_4$—CHR$_5$O)$_n$CH$_2$—, and —(CO)O (CH$_2$)$_m$OCH$_2$, wherein n is 1 to 4, m is 1 to 4, $R_4$ and $R_5$ are independently H, methyl, or ethyl; and (x) the ratio of said elastomer to crystallizable abietic acid derivative-based tackifier is from about 3:1 to about 1:5 by weight.

In another embodiment, the invention provides a temperature switchable adhesive assembly comprising: a backing and a coating comprising the aforementioned composition.

In another embodiment, the invention provides a method for imparting temperature switchable properties to an elastomer comprising the steps of:

a) providing at least one elastomer; and
b) mixing the at least one elastomer with at least one crystallizable abietic acid derivative-based tackifier having the formula:

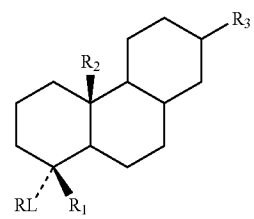

(I)

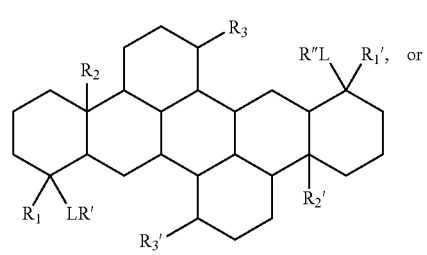

(II)

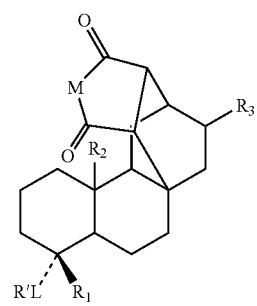

(III)

wherein:
(i) R is a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid;

(ii) $R_1$, $R_2$, $R_1'$, and $R_2'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms, provided that if the ring containing $R_1$ and $R_2$ is aromatic, then $R_1$ and $R_2$ are not present, and if the ring containing $R_1'$ and $R_2'$ is aromatic, then $R_1'$ and $R_2'$ are not present;

(iii) $R_3$ and $R_3'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms;

(iv) R' and R" are independently R, H, methyl, ethyl, glycerol, or glycol;
(v) M is O or NRL;
(vi) the six-membered rings have carbon-carbon single bonds or a combination of carbon-carbon single bonds and carbon-carbon double bonds;
(vii) the six membered rings of (I) and (III) are independently aromatic or non-aromatic, provided that no more than two of the rings are aromatic;
(viii) the six membered rings of (II) are independently aromatic or non-aromatic, provided that no more than four of the rings are aromatic;
(ix) L is an optional spacer selected from the group consisting of:
—(CO)—, —O—(CO)—, —OCH$_2$—, vinyl, amide,

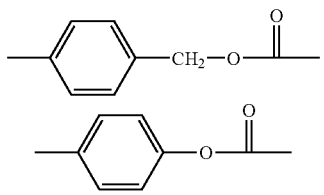

—(CO)O(CHR$_4$—CHR$_5$O)$_n$CH$_2$—, and —(CO)O (CH$_2$)$_m$OCH$_2$,
wherein n is 1 to 4, m is 1 to 4, R$_4$ and R$_5$ are independently H, methyl, or ethyl; and
(x) the ratio of said elastomer to crystallizable abietic acid derivative-based tackifier is from about 3:1 to about 1:5 by weight.

DETAILED DESCRIPTION OF THE INVENTION

The invention relates to temperature switchable pressure sensitive adhesives comprising an elastomer and a crystallizable abietic acid derivative as a tackifier. The adhesive properties of these adhesives may be tuned by simply adjusting the ratio of the elastomer and the crystallizable tackifier, and by altering the crystallizable group on the tackifier. These properties include the switching temperature, the peel strength above and below the switching temperature, and the tack above and below the switching temperature.

The invention is useful because the temperature switchable adhesives of the invention have application in industrial, consumer, and medical fields. For example, the temperature switchable adhesives may be used in medical applications to attach adhesive tape, adhesive bandages, immobilization devices, wound dressings, transdermal delivery devices, EKG electrodes, and the like to skin. These devices may be easily removed, without damage to the skin, by changing the temperature. Additionally, the adhesives may be used in industrial and consumer applications, such as masking tapes, stencils, envelopes, stamps, labels, wallpaper, and floor tiles.

The following definitions are used herein and should be referred to for interpretation of the claims and the specification.

The phrase "temperature switchable adhesive" refers to a pressure sensitive adhesive that exhibits a sharp change in peel strength with a change in temperature.

The term "switching temperature" refers to the temperature at which the temperature switchable adhesives of the invention undergo a sharp change in peel strength. The peel strength is high below the switching temperature and decreases sharply above the switching temperature.

The term "peel strength" refers to the strength of the adhesive bond of an adhesive, measured as the average load per unit width of bond line required to separate bonded materials. Standard laminates of the temperature switchable pressure sensitive adhesives on backing and substrates used for measuring the peel strength are prepared according to ASTM Method D-3330. The 90° peel strength is measured according to IPC Test Method 650.

The term "elastomer" refers to a polymer that recovers completely and very quickly from great extensions, which can be up to 1000% or more. As used herein, elastomers include thermoplastic elastomers and uncrosslinked polyolefins that are thermoplastic.

The term "tackifier" refers to a substance added to resins to improve the initial and extended tack range of the adhesive.

The term "tack" refers to the ability of a material to stick to the surface on momentary contact and then to resist separation.

The term "crystallizable group" refers to a chemical group which undergoes a phase transition, specifically crystallization/melting.

The term "crystallizable tackifier" refers to a tackifier having at least one crystallizable group.

The phrase "temperature switchable adhesive assembly" refers to a material comprising a backing coated with a temperature switchable pressure sensitive adhesive.

The term "substrate" refers to any surface to which application of the temperature switchable adhesive assembly is desired.

The invention relates to temperature switchable pressure sensitive adhesives comprising an elastomer and a crystallizable abietic acid derivative as a tackifier. The crystallizable abietic acid derivatives may be readily synthesized and combined with various elastomeric polymers and optionally, various additives, to give temperature switchable adhesives that meet the requirements of many applications. The adhesives of the invention are generally used in the form of a coating on a backing.

Crystallizable Abietic Acid Derivatives

The abietic acid derivatives of the invention contain at least one crystallizable group and act as a crystallizable tackifier. The crystallizable abietic acid derivatives are derivatives of abietic acid or related resin acids, including but not limited to, neoabietic acid, palustric acid, dehydroabietic acid, pimaric acid, and isopimaric acid, and have the formula:

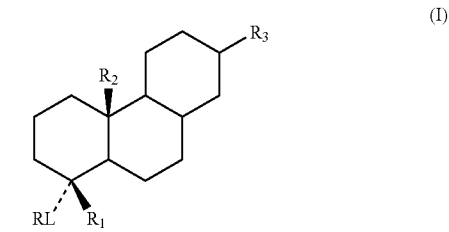

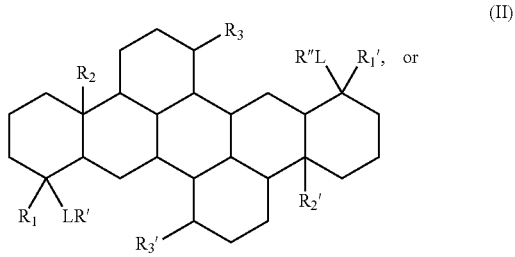

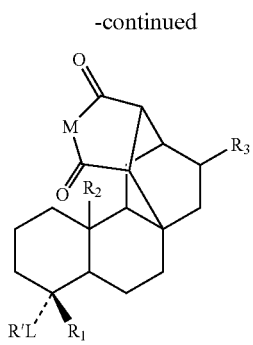

(III)

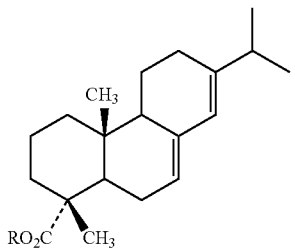

wherein, R is a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid; $R_1$, $R_2$, $R_1'$, and $R_2'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms; provided that if the ring containing $R_1$ and $R_2$ is aromatic, then $R_1$ and $R_2$ are not present, and if the ring containing $R_1'$ and $R_2'$ is aromatic, then $R_1'$ and $R_2'$ are not present; and $R_3$ and $R_3'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms; R' and R" are independently R, H, methyl, ethyl, glycerol, or glycol, M is O, or N(nitrogen)RL; L is an optional spacer, including, but not limited to, —(CO)—, —O—(CO)—, —OCH$_2$—, vinyl, amide,

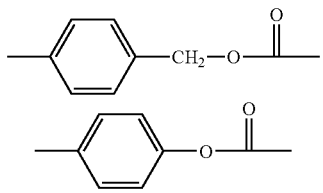

—(CO)O(CHR$_4$—CHR$_5$O)$_n$CH$_2$—, and —(CO)O(CH$_2$)$_m$OCH$_2$—, wherein n is 1 to 4, m is 1 to 4, and $R_4$ and $R_5$ are independently H, methyl or ethyl. The six-membered rings contain carbon-carbon single bonds or a combination of carbon-carbon single bonds and carbon-carbon double bonds and are independently aromatic or non-aromatic, provided that no more than two of the rings in (I) and (III) are aromatic and no more than four of the rings in (II) are aromatic.

In one embodiment, the abietic acid derivative is the hexadecyl ester of abietic acid (i.e., cetyl abietate) having the formula:

wherein R is a linear alkyl group having the formula $C_{16}H_{33}$.

The crystallizable abietic acid derivatives having the formula given as (I) may be prepared from abietic acid or related resin acids. Abietic acid is available commercially from companies such as Sigma-Aldrich (St Louis, Mo.), Spectrum Chemical Mfg. Corp. (New Brunswick, N.J.), and Penta Manufacturing Co. (Fairfield, N.J.). Abietic acid is typically supplied as an impure compound (e.g. 70% purity) and is used without further purification. Resin acids are available as components of rosins from companies such as Eastman Chemical Co. (Kingsport, Tenn.), Georgia-Pacific (Atlanta, Ga.), and Arizona Chemical (Jacksonville, Fla.).

The crystallizable abietic acid derivatives having the formula given as (II) may be prepared from the abietic acid dimer, which is available from Eastman Chemical Co. The crystallizable abietic acid derivatives having the formula given as (III) may be prepared from the maleic derivative of abietic acid, which is available from Eastman Chemical Co. Alternatively, the maleic derivative may be prepared by reacting pimaric acid with maleic anhydride.

The crystallizable abietic acid derivatives of the invention may be prepared using methods known in the art. The optional spacer may be used to facilitate the covalent attachment of the crystallizable group to abietic acid or the related resin acids. The spacer will depend on the particular chemistry used to prepare the crystallizable abietic acid derivative. For example, abietic acid esters or esters of related resin acids, wherein the spacer is —O(CO)—, may be prepared by reaction of abietic acid or a resin acid with a long chain alkyl alcohol, such as hexadecanol, in the presence of a stoichiometric amount of carbonyl diimidazole and a trace of a Bronsted acid to accelerate the reaction. Additionally, abietic acid esters or esters of related resin acids may be prepared by the reaction of the acid chloride with a long chain alkyl alcohol, such as hexadecanol, in a suitable solvent in the presence of a hydrochloride acceptor such as triethylamine. The esters may also be prepared by direct esterification either in the presence or absence of a suitable esterification catalyst, either in solution or in the melt. The esters may also be prepared by transesterification of abietic acid esters or esters of resin acids with the alcohol or by transesterification of the hydrogenated abietyl alcohols with esters of the long chain alkyl alcohols in the presence or absence of a suitable esterification catalyst in solution or in the melt.

Derivatives having —(CO)O(CH$_2$)$_m$OCH$_2$— as a spacer may be prepared, for example, by esterification reactions with abietic acid, abietyl alcohol, or hydroabietal alcohol. Derivatives having an amide group as a spacer may be prepared, for example, by reacting a long chain amine with abietic acid or abietic acid ester. Derivatives having a vinyl group as a spacer may be prepared by reacting abietic acid with an organolithium compound, followed by acid catalyzed dehydration. Derivatives having —(CO)— as a spacer may be prepared, for example, by reacting abietic acid ester with an organolithium compound followed by oxidation. Derivatives with the phenyl-based spacers may be prepared, for example, by esterification of abietic acid with a long chain substituted phenol. Additionally, derivatives without a spacer may be prepared, for example, by reacting abietic acid ester with an organolithium compound, followed by hydrogenation. The derivative of formula (III) having a crystallizable group at position M may be prepared, for example, by reacting the maleic derivative of abietic acid with a long chain amine.

Temperature Switchable Pressure Sensitive Adhesives

The temperature switchable pressure sensitive adhesives of the invention comprise an elastomer and a crystallizable abietic acid derivative. Mixtures of two or more elastomers and/or two or more crystallizable abietic acid derivatives may also be used. The temperature switchable adhesives of the invention have temperature switchable adhesion and temperature switchable tack. The adhesion is high below the switching temperature and decreases sharply above the switching temperature. In contrast, the tack is low below the switching temperature and increases sharply above the switching temperature.

Any suitable elastomer known in the pressure sensitive adhesive art may be useful in the invention, including, but not limited to, thermoplastic rubbers, natural rubbers, butyl rubbers, polyisobutylene polymers, vinyl ether polymers, ethylene/acrylic copolymers, and silicone-based rubbers. Preferably, the elastomer is a thermoplastic rubber of the ABA block copolymer type, wherein A is a thermoplastic polystyrene end block and B is a rubber mid-block, such as polyisoprene, polybutadiene, and poly(ethylene/butylene). Typically, the elastomer has a thermoplastic polystyrene end-block content of about 14% to about 30% by weight of the block copolymer. Suitable elastomers are available from commercial sources, such as Sigma-Aldrich, and the Dow Chemical Co. (Midland, Mich.).

In one embodiment, the elastomer is a styrene-isoprene-styrene triblock copolymer which has a styrene content of about 14% to about 22% by weight. In another embodiment, the elastomer is a styrene-isoprene-styrene triblock copolymer which has a styrene content of about 22% by weight.

The adhesive properties of the temperature switchable pressure sensitive adhesives of the invention may be tuned for different applications. The switching temperature may be tuned coarsely by changing the crystallizable group. For example, the abietic acid ester of octadecyl alcohol has a higher switching temperature than the ester of hexadecyl alcohol. Other properties of the temperature switchable pressure sensitive adhesives may be adjusted by changes in formulation, as is well known in the art. For example, tack may be increased at the expense of peel strength by increasing the ratio of tackifier to elastomer. In the temperature switchable pressure sensitive adhesives of the invention, the elastomer and the crystallizable abietic acid derivative-based tackifier are typically used in a ratio from about 3:1 to about 1:5 by weight. In one embodiment, the ratio of elastomer to crystallizable abietic acid derivative-based tackifier is 1:3 by weight. Cohesive strength (i.e., the strength of the forces that hold adjacent molecules together within the adhesive) may be improved by increasing the molecular weight of the elastomer, at the expense of ease of processing. The cohesive properties of the temperature switchable pressure sensitive adhesive may likewise be improved by means of cross-linking the elastomeric component. These principles of formulation are well understood by those skilled in the art of pressure sensitive adhesives.

The temperature switchable pressure sensitive adhesives of the invention may optionally comprise one or more additives, which are known in the art. Examples of suitable additives include, but are not limited to, oils, inorganic extenders, stabilizers, antioxidants, plasticizers, flow modifiers, dyes, pigments, other tackifiers, heat reactive curing compounds, light reactive curing compounds, and wetting agents. These additives may be incorporated into the temperature switchable pressure sensitive adhesives of the invention in minor or larger amounts, depending on the intended use of the adhesive.

The temperature switchable pressure sensitive adhesives may be prepared using techniques known in the art. For example, the elastomer, the crystallizable tackifier, and the optional additives may be dissolved in a suitable solvent and applied to a backing, with subsequent removal of the solvent, as described below. Alternatively, the aforementioned ingredients may be blended in the melt using a high shear mixer or an extruder.

Temperature Switchable Adhesive Assemblies

The temperature switchable pressure sensitive adhesives of the invention are generally used as a coating on a backing to form a temperature switchable adhesive assembly. Any appropriate backing may be used, including, but not limited to, tapes, films or sheets of synthetic or natural polymers, woven or nonwoven fabrics, and paper products, such as labels, paper tapes, envelopes, stamps, and cardboard. The backing should maintain structural integrity at the temperature of application to the desired surface and at the elevated temperature required to release the assembly from the surface. The backing may be coated with the temperature switchable pressure sensitive adhesive in various ways, including, but not limited to, spraying, painting, dipping, gravure printing, rolling, laminating, and the like. The adhesive composition may also be applied by transfer from a release sheet. For example, coating technologies widely practiced in the pressure sensitive adhesive art may be employed for laminating these temperature switchable adhesives to backings and release paper (see for example, *Handbook of Pressure-Sensitive Adhesive Technology*, D. Satas, ed, Van Nostrand Reinhold, New York, N.Y., 1982). These coating technologies include, but are not limited to, knife-over-roll, trailing blade, wire-wound rod, air doctor, reverse roll, gravure roll, and slot orifice. The composition may be applied neat, or in a suitable solvent, or as an emulsion or a latex.

The thickness of the adhesive layer will vary depending on the intended application. Typically, the thickness of the adhesive layer is about 0.5 mils (0.0127 mm) to about 25 mils (0.76 mm). The appropriate adhesive layer thickness for any particular application may be readily determined using routine experimentation by one skilled in the art.

The temperature switchable adhesive assemblies of the invention may be used for a variety of medical applications in the form of adhesive tapes, adhesive bandages, immobilization devices, wound dressings, transdermal delivery devices, EKG electrodes, and the like. Additionally, the assemblies may be used for industrial and consumer applications, such as masking tapes, stencils, envelopes, stamps, labels, wallpaper, and floor tiles.

The temperature switchable adhesive assembly is attached to the desired substrate by applying it to the surface with a small amount of pressure. Because the temperature switchable adhesives of the invention have temperature switchable tack that changes in the opposite direction as the adhesive strength, the assembly is applied to the desired substrate at a temperature above the switching temperature to form the bond and then is cooled to a temperature below the switching temperature to maintain the bond. The assembly is left in place for as long as desired and then is removed by increasing the temperature to the point where the adhesive properties are significantly diminished. The temperature may be increased using any suitable means depending on the application. For example, a warm compress, a chemical heat pack, a heating pad, or warm water may be used for medical applications, while a hair dryer, a hot air gun, an oven, a warming chamber, or ambient heat may be used for industrial and consumer applications.

In another embodiment, the invention provides a method for imparting temperature switchable properties to an elastomer comprising mixing the elastomer with a crystallizable abietic acid derivative-based tackifier, using the methods described above.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "sec" means second(s), "mL" means milliliter(s), "μL" means microliter(s), "cm" means centimeter(s), "mm" means millimeter(s), "μm" means micrometer(s), "mils' means thousandths of an inch, "g" means gram(s), "mg" means milligram(s), "kg" means kilogram(s), "mmol" means millimole(s), "lb" means pound(s), "J" means joule(s), "amu" means atomic mass units, "ppm" means parts per million, "$^1$H NMR" means proton nuclear magnetic resonance spectroscopy, "LC-MS" means liquid chromatography-mass spectrometry, "wt %" means percent by weight, and "PVC" means poly(vinyl chloride).

Example 1

Preparation of the Hexadecyl Ester of Abietic Acid

The purpose of this Example was to prepare the hexadecyl ester of abietic acid for use as a crystallizable tackifier in temperature switchable adhesives.

Abietic acid (4.03 g, 70% purity, Sigma-Aldrich, St Louis, Mo.), 1-hexadecanol (2.67 g, Sigma-Aldrich), and p-toluenesulfonic acid monohydrate (6.0 mg, Sigma-Aldrich) were dissolved in 10 mL of pyridine. After addition of 2.47 g of 1,3-dicyclohexylcarbodiimide (Sigma-Aldrich), the solution was stirred at room temperature for 24 h. After filtration, the solvent was removed by rotary evaporation. The remaining material was then dissolved in dichloromethane, washed with water, and dried over sodium sulfate. After evaporating off the dichloromethane by means of a rotary evaporator, the product was dried under vacuum overnight to give 8.44 g of crude product, which was used as is. $^1$H NMR confirmed the presence of the hexadecyl group esterified to the abietic acid in a ratio of approximately 1:1.

Example 2

Temperature Switchable Pressure Sensitive Adhesive

The purpose of this Example was to prepare a temperature switchable pressure sensitive adhesive using the hexadecyl ester of abietic acid as tackifier. The temperature switchable peel strength and tack of the adhesive was demonstrated.

Temperature Switchable Peel Strength:

An adhesive film of the triblock copolymer polystyrene-block-polyisoprene-block-polystyrene (CAS No. 25038-32-8, 22 wt % styrene, melt index 3 g/10 min, viscosity 12 poise (25 wt % in toluene, 25° C., Brookfield), available from Sigma-Aldrich), blended in a 1:3 weight ratio with the hexadecyl ester of abietic acid (prepared as described in Example 1), was prepared as follows.

A toluene solution that contained 12.5 wt % of the triblock copolymer of styrene and isoprene and 12.5 wt % of the hexadecyl ester of abietic acid was cast using a doctor blade at 50 mils (1.27 mm) thickness onto a siliconized release film which was affixed to a glass plate with adhesive tape. The solvent was then evaporated by drying at 70° C. in a vacuum oven for 30 min. The resulting adhesive film was laminated onto a PVC-faced cloth (96.5 μm thickness), textured to be a leather look-alike (obtained from a local fabric store), at 65° C. according to ASTM Method D-3330. For creating the adhesive bonds by the ASTM procedure, an aluminum metal plate was used which was heated by a hotplate. The temperature of the metal plate was maintained by manual temperature adjustment using a thermocouple to monitor the temperature. This is referred to as the "set temperature" as listed in the data. A 2.5 lb (1.13 kg) metal wallpaper seam roller, attached to an Instron® device with a cross-head speed of 12 in/min (30.5 cm/min), was used to laminate the bond by rolling it back and forth across the sample. The resulting laminate was allowed to cool to room temperature. The PVC coated with the adhesive was then applied to substrates by simply peeling off the release film. The thickness of the adhesive layer was measured with an Ames thickness gauge to be 114±33 μm.

The samples were maintained at the set temperature in a temperature-controlled oven until the samples were ready for measuring the temperature dependence of the 90° peel strength. The peel strength measurements were done according to IPC Test Method 650, using an Instron® device equipped with a temperature-controlled oven and a metal wheel. The sample was mounted on the wheel using double-faced Kapton® adhesive tape on the edge of the roller and metal adhesive tape to hold down the ends. The sample sizes were typically 1 inch×3 inches (2.5 cm×7.6 cm) or 0.5 inch×3 inches (1.3 cm×7.6 cm). The clamps on the Instron® device were attached to the free end of the backing material. The samples were temperature equilibrated for 2 min before testing. The samples were pulled at 6 inches/min (15.2 cm/min), and the data was recorded and processed using MTS Test Works 4 system, purchased from the MTS Systems Corp. (Eden Prairie, Minn.) for software test control and data acquisition. Load and displacement were captured through an analog to digital card and the average calculated by integration through selected points on the curve. The peel strength as a function of temperature was then determined, allowing a 2 min equilibration time for the samples at each temperature. The peel strengths at different temperatures, given as the average of two determinations, are shown in Table 1.

TABLE 1

Peel Strengths of the Temperature Switchable Pressure
Sensitive Adhesive as a Function of Temperature

| Temperature °C. | Peel Strength g/mm |
|---|---|
| 23 | 24.65 |
| 27 | 19.25 |
| 31 | 21.25 |
| 37 | 11.78 |
| 45 | 3.97 |
| 50 | 1.59 |
| 55 | 1.50 |

The data shows that there was a sharp decrease in peel strength between temperatures of 31° C. and 50° C., demonstrating the temperature switchable property of the adhesive.

Temperature Switchable Tack:

The styrene-isoprene-styrene triblock copolymer (CAS No. 25038-32-8, 22 wt. % styrene, melt index 3 g/10 min, viscosity 12 poise) and abietic acid hexadecyl ester (prepared as described in Example 1) were dissolved in toluene to give a solution with 25 wt % solids and a 1:3 weight ratio of styrene-isoprene-styrene triblock copolymer to abietic acid hexadecyl ester. This solution was cast onto a PVC film backing using a doctor blade and dried in a vacuum oven using the method described above. The coated PVC film was then mounted on a glass slide by means of adhesive tape and the film was equilibrated at the desired temperature. The tack as a function of temperature was assessed by means of a finger pressure test according to the following scale: (−) no detectable tack, (+) application of momentary finger pressure caused sufficient bonding to begin to lift the microscope slide off the lab bench, (++) application of momentary finger pressure caused sufficient bonding to lift the microscope slide off the lab bench, with the slide quickly debonding just from the force of gravity, (+++) application of momentary finger pressure caused sufficient bonding to lift the microscope slide off the lab bench, with the slide slowly debonding (greater than 10 sec) under the force of gravity, (++++) application of momentary finger pressure caused sufficient bonding to lift the microscope slide off the lab bench and not debond under the force of gravity. The results are summarized in Table 2.

TABLE 2

Tack of the Temperature Switchable Adhesive
as a Function of Temperature

| Temperature, ° C. | Tack Assessment |
|---|---|
| 4 | + |
| 23 | + |
| 37 | +++ |
| 45 | ++ |

These results demonstrate that the tack of the temperature switchable adhesive increases as the temperature is raised above the switching temperature.

Example 3 (Comparative)

Conventional Pressure Sensitive Adhesive

The purpose of this comparative Example was to demonstrate the absence of temperature switchable peel strength for a conventional pressure sensitive adhesive that was made using underivatized abietic acid as tackifier.

For casting films of the adhesive, a solution of 20 g of abietic acid in tetrahydrofuran (25.7 wt %) was mixed with 15.42 g of mineral oil. To this solution was added 23.2 g of styrene-isoprene-styrene triblock copolymer (PSIS) as a 25 wt % solution in toluene. The resulting solution was mixed in a mill jar on a tumbler for 30 min, giving a final concentration of 40 wt. % solids, with weight ratios of PSIS to abietic acid to mineral oil of 2:1:3. This solution was cast to a thickness of 30 mils (760 μm) using a doctors blade onto siliconized release paper that was mounted on a glass plate. The solution cast film was then dried for 30 min in a vacuum oven at 70° C. A PVC backing was applied to the adhesive at 70° C. and was smoothed out with a wallpaper seam roller, which readily transferred the film to the PVC backing. The release paper was peeled off the adhesive after cooling to room temperature. A second layer of adhesive film was prepared identically and layered on this film at 70° C. to give a total thickness of 15.5±5.4 mils (394±137 μm). The resulting adhesive film was stored with a release paper covering until it was ready for use.

To determine the peel strength of the adhesive as a function of temperature, the release paper was removed from the adhesive film and 0.5 inch×3.0 inch (1.27 cm×7.62 cm) strips of adhesive on PVC were laminated onto PVC-faced cloth, textured to be a leather look-alike, according to ASTM Method D-3330 (as described in Example 2). The peel strength measurements were done according to IPC Test Method 650, as described in Example 2. The results of the peel test are given in Table 3 as the averages of three determinations at each temperature. The data in the table shows that this conventional pressure sensitive adhesive maintains high peel strength throughout the temperature range studied, demonstrating that it does not have temperature switchable properties.

TABLE 3

Peel Strengths of the Conventional Pressure Sensitive Adhesive
with Abietic Acid as Tackifier as a Function of Temperature

| Temperature ° C. | Average Peel Strength g/mm | Standard Deviation of Peel Strength g/mm |
|---|---|---|
| 23 | 33.7 | 3.4 |
| 30 | 30.3 | 3.8 |
| 35 | 33.6 | 10.0 |
| 40 | 37.5 | 8.6 |
| 45 | 30.9 | 7.1 |
| 50 | 18.9 | 4.1 |

Example 4 (Comparative)

Conventional Pressure Sensitive Adhesive

The purpose of this comparative Example was to demonstrate the absence of temperature switchable peel strength for a conventional pressure sensitive adhesive that was made using poly-β-pinene as tackifier.

An adhesive film of the triblock copolymer polystyrene-block-polyisoprene-block-polystyrene (CAS No. 25038-32-8, 22 wt % styrene, melt index 3 g/10 min, viscosity 12 poise (25 wt % in toluene, 25° C., Brookfield), obtained from Sigma-Aldrich), blended in a 1:3 weight ratio with poly-β-pinene (Sigma-Aldrich), was prepared according to the procedure described in Example 2. The film was laminated onto the PVC-faced cloth at 65° C. according to ASTM Method D-3330. The adhesive thickness was 10.73±4.34 mils (0.272±0.110 mm). The peel strength as a function of temperature was then determined, allowing two minutes equilibration time for the samples at each temperature, as described in Example 2. The peel strengths versus temperature results, given as the average of two determinations, are shown in Table 4.

TABLE 4

Peel Strengths of the Conventional Pressure Sensitive Adhesive with Poly-β-Pinene as Tackifier as a Function of Temperature

| Temperature °C. | Peel Strength g/mm |
|---|---|
| 18 | 27.15 |
| 23 | 40.28 |
| 27 | 52.30 |
| 31 | 98.29 |
| 37 | 76.11 |
| 45 | 36.27 |

As can be seen from the data in Table 4, there was no sharp change in peel strength over the temperature range studied, demonstrating that the conventional pressure sensitive adhesive does not have temperature switchable properties.

Example 5

Preparation of the Palmitic Ester of the Tetrahydroabietyl Alcohol Monoether of Ethylene Glycol The purpose of this Example was to prepare the palmitic ester of the tetrahydroabietyl alcohol monoether of ethylene glycol, which would be expected to function as a crystallizable tackifier for use in temperature switchable adhesives. The reaction scheme used in the preparation is as follows:

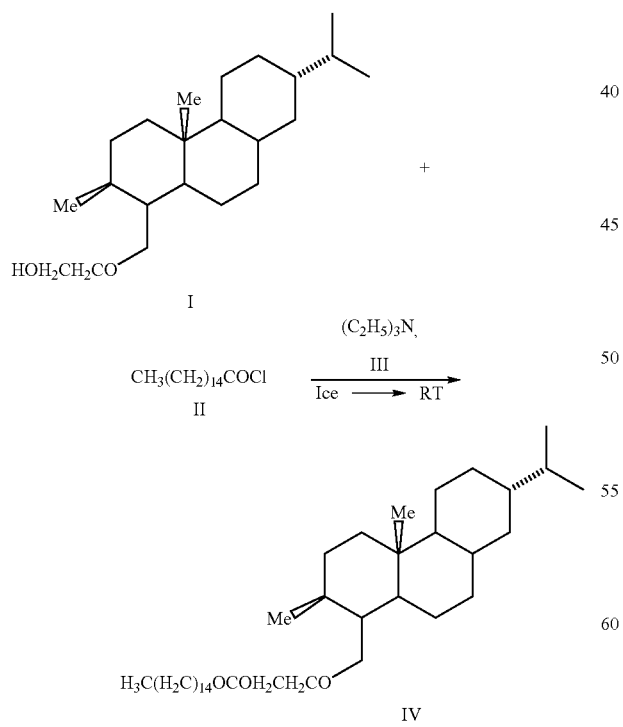

Triethylamine (III) (4.81 mL, 34.61 mmol, 1.2 equivalents) was added to 10.0 g of tetrahydroabietyl alcohol monoether of ethylene glycol (I) (Abitol® E, obtained from Eastman Chemical Co.) (28.74 mmol) in 40 mL of dichloromethane, which was pre-chilled in an ice bath. Palmitoyl chloride (II) (10.5 mL, 34.61 mmol), obtained from Sigma-Aldrich, was added dropwise with stirring, after which the reaction solution became cloudy. The solution was stirred in an ice bath for 0.5 h and then at room temperature overnight. The reaction was monitored using $^1$H NMR by periodically withdrawing aliquots. The reaction mixture was then washed with water (approximately 40 mL) three times, and the organic layer was dried over sodium sulfate. After filtration, the solvent was evaporated by means of rotary evaporation. The resulting cloudy solution (about 50 mL) was dissolved in 150 mL of ethyl acetate (with some undissolved solids) and washed with 100 mL of NaOH solution (pH of about 10) and then with deionized water. The organic layer was separated from the aqueous layer and was dried over sodium sulfate. After filtration, the solvent was evaporated by means of rotary evaporation and dried under vacuum overnight to give a solid product.

The solid product was analyzed using a variety of techniques. Differential scanning calorimetry (DSC) indicated a melting point at 49° C. in the first heat, which was small (11.7 J/g), and a very broad exotherm centered at 177° C. On cooling, there was a small exotherm at 43° C. In the second heat, the endotherm occurred at 59° C., again small, with no other thermal events evident. The mass spectrum showed a parent ion at 574 amu for $C_{38}H_{70}O_3$. The LC-MS also showed a peak with mass 531 amu, for the hydroabietyl alcohol, palmitic acid ester, without an intervening ethylene oxide. The LC-MS showed no evidence of free palmitic acid. The $^1$H NMR showed that the methylenes appear as a single resonance at 1.1 ppm, with a triplet for the terminal methyl group at 0.7 ppm, and a methylene resonance at 2.7 ppm, in addition to resonances for the hydroabietyl portion of the molecule. The intensity of the hydroabietyl resonances compared to the palmitic acid portion of the molecule indicated that the product was the ester of hydroabietyl alcohol with palmitic acid.

What is claimed is:

1. A composition comprising:
   a) at least one elastomer; and
   b) at least one crystallizable abietic acid derivative-based tackifier having the formula:

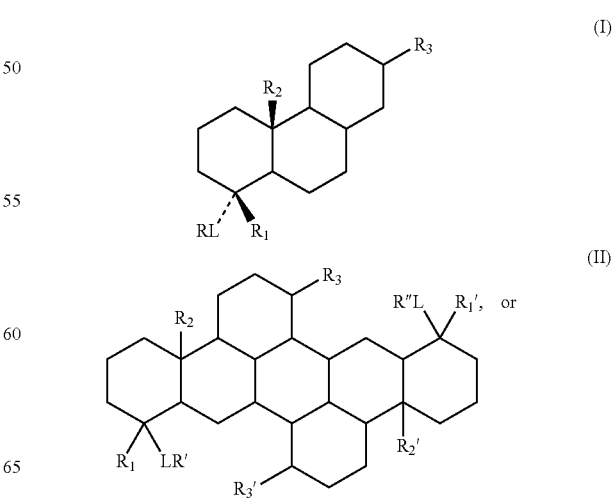

-continued

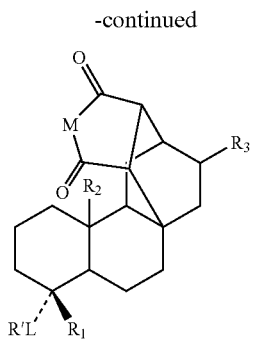

(III)

wherein:
  (i) R is a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid;
  (ii) $R_1$, $R_2$, $R_1'$, and $R_2'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms, provided that if the ring containing $R_1$ and $R_2$ is aromatic, then $R_1$ and $R_2$ are not present, and if the ring containing $R_1'$ and $R_2'$ is aromatic, then $R_1'$ and $R_2'$ are not present;
  (iii) $R_3$ and $R_3'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms;
  (iv) R' and R'' are independently R, H, methyl, ethyl, glycerol, or glycol;
  (v) M is O or NRL;
  (vi) the six-membered rings have carbon-carbon single bonds or a combination of carbon-carbon single bonds and carbon-carbon double bonds;
  (vii) the six membered rings of (I) and (III) are independently aromatic or non-aromatic, provided that no more than two of the rings are aromatic;
  (viii) the six membered rings of (II) are independently aromatic or non-aromatic, provided that no more than four of the rings are aromatic;
  (ix) L is an optional spacer selected from the group consisting of:
    —(CO)—, —O—(CO)—, —OCH$_2$—, vinyl, amide,

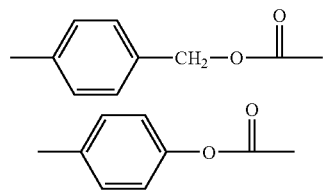

—(CO)O(CHR$_4$—CHR$_5$O)$_n$CH$_2$—, and —(CO)O(CH$_2$)$_m$OCH$_2$, wherein n is 1 to 4, m is 1 to 4, $R_4$ and $R_5$ are independently H, methyl, or ethyl; and
  (x) the ratio of said elastomer to crystallizable abietic acid derivative-based tackifier is from about 3:1 to about 1:5 by weight.

2. The composition according to claim 1 wherein the crystallizable abietic acid derivative-based tackifier has the formula:

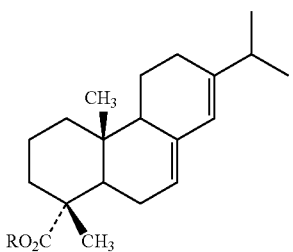

wherein R is a linear alkyl group having the formula $C_{16}H_{33}$.

3. The composition according to claim 1, wherein the ratio of elastomer to crystallizable abietic acid derivative-based tackifier is 1:3 by weight.

4. The composition according to claim 1, wherein the elastomer is an ABA block copolymer, wherein
  a) A is a thermoplastic polystyrene end-block; and
  b) B is a rubber mid-block selected from the group consisting of polyisoprene, polybutadiene, and poly(ethylene/butylene);
wherein the elastomer has a thermoplastic polystyrene end-block content of about 14% to about 30% by weight.

5. The composition according to claim 4, wherein the ABA block copolymer is a styrene-isoprene-styrene triblock copolymer having a styrene content of about 14% to about 22% by weight.

6. The composition according to claim 4, wherein the ABA block copolymer is a styrene-isoprene-styrene triblock copolymer having a styrene content of about 22% by weight.

7. The composition according to claim 1 further comprising one or more additives selected from the group consisting of: oils, inorganic extenders, stabilizers, antioxidants, plasticizers, flow modifiers, dyes, pigments, other tackifiers, heat reactive curing compounds, light reactive curing compounds, and wetting agents.

8. A temperature switchable adhesive assembly comprising:
  a) a backing; and
  b) a coating comprising the composition of claim 1.

9. The temperature switchable adhesive assembly according to claim 8, wherein the backing is selected from the group consisting of: tapes, films of synthetic polymers, films of natural polymers, sheets of synthetic polymers, sheets of natural polymers, woven fabrics, nonwoven fabrics, and paper products.

10. The temperature switchable adhesive assembly according to claim 8, wherein the coating has a thickness of about 0.0127 mm to about 0.76 mm.

11. The temperature switchable adhesive assembly according to claim 8, wherein the assembly has a form selected from the group consisting of adhesive tapes, adhesive bandages, immobilization devices, wound dressings, transdermal delivery devices, EKG electrodes, masking tapes, stencils, envelopes, labels, stamps, wall paper, and floor tiles.

12. A method for imparting temperature switchable properties to an elastomer comprising the steps of:
   a) providing at least one elastomer; and
   b) mixing the at least one elastomer with at least one crystallizable abietic acid derivative-based tackifier having the formula:

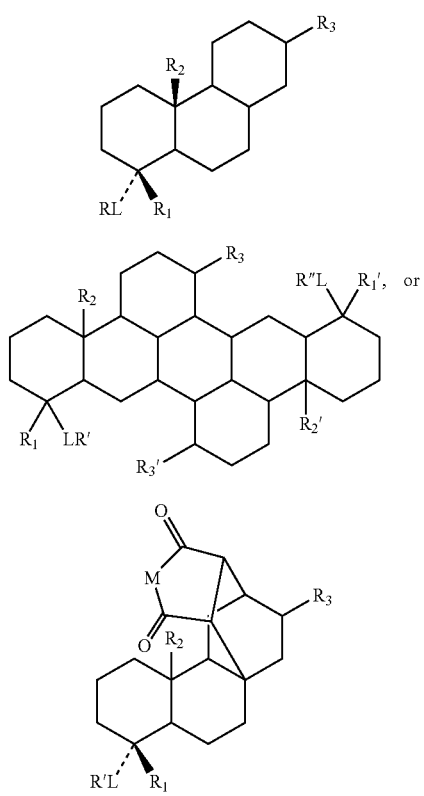

wherein:
   (i) R is a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid;
   (ii) $R_1$, $R_2$, $R_1'$, and $R_2'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms, provided that if the ring containing $R_1$ and $R_2$ is aromatic, then $R_1$ and $R_2$ are not present, and if the ring containing $R_1'$ and $R_2'$ is aromatic, then $R_1'$ and $R_2'$ are not present;
   (iii) $R_3$ and $R_3'$ are independently H, a linear substituted or unsubstituted alkyl group having 1 or 2 carbon atoms, a linear or branched, substituted or unsubstituted alkyl group having 3 carbon atoms, a linear substituted or unsubstituted alkenyl group having 2 carbon atoms, or a linear or branched, substituted or unsubstituted alkenyl group having 3 carbon atoms;
   (iv) R' and R" are independently R, H, methyl, ethyl, glycerol, or glycol;
   (v) M is O or NRL;
   (vi) the six-membered rings have carbon-carbon single bonds or a combination of carbon-carbon single bonds and carbon-carbon double bonds;
   (vii) the six membered rings of (I) and (III) are independently aromatic or non-aromatic, provided that no more than two of the rings are aromatic;
   (viii) the six membered rings of (II) are independently aromatic or non-aromatic, provided that no more than four of the rings are aromatic;
   (ix) L is an optional spacer selected from the group consisting of:
   —(CO)—, —O—(CO)—, —OCH$_2$—, vinyl, amide,

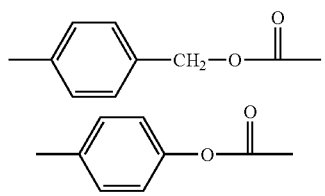

—(CO)O(CHR$_4$—CHR$_5$O)$_n$CH$_2$—, and —(CO)O(CH$_2$)$_m$OCH$_2$, wherein n is 1 to 4, m is 1 to 4, $R_4$ and $R_5$ are independently H, methyl, or ethyl; and
   (x) the ratio of said elastomer to crystallizable abietic acid derivative-based tackifier is from about 3:1 to about 1:5 by weight.

13. The method according to according to claim 12 wherein the crystallizable abietic acid derivative-based tackifier has the formula:

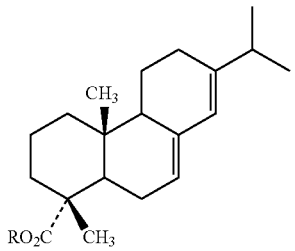

wherein R is a linear alkyl group having the formula $C_{16}H_{33}$.

14. The method according to claim 12, wherein the ratio of elastomer to crystallizable abietic acid derivative-based tackifier is 1:3 by weight.

15. The method according to claim 12, wherein the elastomer is an ABA block copolymer, wherein
   a) A is a thermoplastic polystyrene end-block; and
   b) B is a rubber mid-block selected from the group consisting of polyisoprene, polybutadiene, and poly(ethylene/butylene);
   wherein the elastomer has a thermoplastic polystyrene end-block content of about 14% to about 30% by weight.

16. The method according to claim 15, wherein the ABA block copolymer is a styrene-isoprene-styrene triblock copolymer having a styrene content of about 14% to about 22% by weight.

17. The method according to claim 15, wherein the ABA block copolymer is a styrene-isoprene-styrene triblock copolymer having a styrene content of about 22% by weight.

* * * * *